US008718620B2

(12) United States Patent
Rosenblatt

(10) Patent No.: US 8,718,620 B2
(45) Date of Patent: May 6, 2014

(54) PERSONAL MEDIA DEVICES WITH WIRELESS COMMUNICATION

(75) Inventor: Michael Rosenblatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 649 days.

(21) Appl. No.: 11/598,952

(22) Filed: Nov. 13, 2006

(65) Prior Publication Data
US 2008/0113614 A1    May 15, 2008

(51) Int. Cl.
*H04M 3/42* (2006.01)

(52) U.S. Cl.
USPC ............... 455/414.3; 455/414.1; 455/414.2; 725/109

(58) Field of Classification Search
USPC ................................. 455/414.1, 414.2, 414.3
See application file for complete search history.

(56) References Cited

U.S. PATENT DOCUMENTS

| | | | | |
|---|---|---|---|---|
| 2001/0018349 | A1* | 8/2001 | Kinnunen et al. | 455/456 |
| 2002/0087335 | A1* | 7/2002 | Meyers et al. | 705/1 |
| 2004/0176080 | A1* | 9/2004 | Chakravorty et al. | 455/414.1 |
| 2004/0258219 | A1* | 12/2004 | Breitenbach et al. | 379/88.22 |
| 2006/0149632 | A1* | 7/2006 | Register et al. | 705/14 |
| 2006/0168351 | A1* | 7/2006 | Ng et al. | 709/248 |
| 2007/0010195 | A1* | 1/2007 | Brown et al. | 455/3.06 |
| 2007/0014314 | A1* | 1/2007 | O'Neil | 370/503 |
| 2007/0050673 | A1* | 3/2007 | DiBartolomeo et al. | 714/27 |
| 2007/0077921 | A1* | 4/2007 | Hayashi et al. | 455/414.1 |
| 2007/0130283 | A1* | 6/2007 | Klein et al. | 709/217 |
| 2007/0155307 | A1 | 7/2007 | Ng et al. | |
| 2007/0161402 | A1 | 7/2007 | Ng et al. | |
| 2007/0220552 | A1* | 9/2007 | Juster et al. | 725/46 |
| 2007/0291710 | A1 | 12/2007 | Fadell | |
| 2008/0076447 | A1* | 3/2008 | Duxbury et al. | 455/456.1 |
| 2008/0305738 | A1* | 12/2008 | Khedouri et al. | 455/3.06 |
| 2010/0174782 | A1* | 7/2010 | Rose | 709/204 |

\* cited by examiner

*Primary Examiner* — Charles Appiah
*Assistant Examiner* — Mazda Sabouri
(74) *Attorney, Agent, or Firm* — Fletcher Yoder PC

(57) ABSTRACT

Systems and methods are provided for personal media devices having the ability to communicate wirelessly, and in particular, communicate wirelessly using a short-range communications protocol (e.g., Wi-Fi and Bluetooth). Such communication provides users of personal media devices with access to several Wi-Fi oriented applications. For example, in one embodiment a personal media device may wirelessly download subscription assets (e.g., podcast) as they become available. In another embodiment, content specific or local to a merchant may be provided to personal media devices that are in wireless communication with a wireless router affiliated with the merchant. For example, if the merchant is a restaurant, the merchant may provide a menu to the personal media device and the user may place an order on his or her media device by selecting items on the menu.

16 Claims, 21 Drawing Sheets

PERSONAL MEDIA DEVICES WITH WIRELESS COMMUNICATION

BACKGROUND OF THE INVENTION

This relates to personal media devices with wireless communication capability and applications thereof.

The proliferation of personal media devices (e.g., portable MP3 players) and the relative ease in which media can be obtained (e.g., by wirelessly downloading such media) for such devices has created a need for improved media management, access to more relevant content, and customization of that content.

SUMMARY OF THE DISCLOSURE

Systems and methods are provided for personal media devices having the ability to communicate wirelessly, and in particular, communicate wirelessly using a short-range communications protocol (e.g., Wi-Fi and Bluetooth). Various advantages and applications using wireless communication in accordance with the principle of the present invention are discussed in more detail below.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
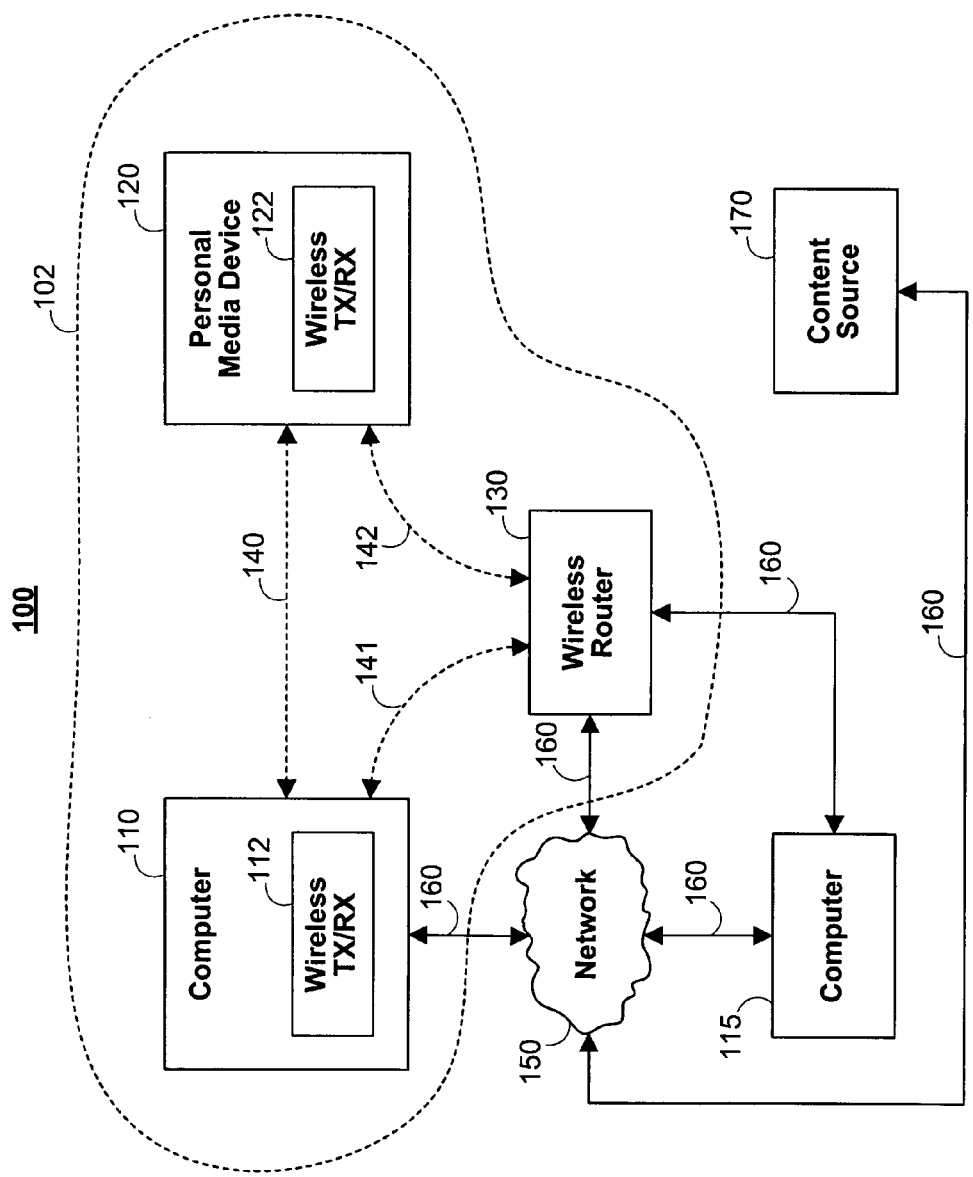
FIG. 1 is a block diagram of a wireless network system for enabling a personal media device to wirelessly communicate directly or indirectly with a computer in accordance with the principles of the present invention.

FIG. 1 is a block diagram of a wireless network system 100 for enabling a personal media device to wirelessly communicate directly or indirectly with a computer in accordance with the principles of the present invention. Personal media device 120 may wirelessly communicate with a host computer in any number of different ways, three of which are illustrated in FIG. 1. Wireless communication may be performed with a relatively short-range wireless communication protocol such as Wi-Fi (e.g., a 802.11 protocol), Bluetooth (registered trademark), high frequency systems (e.g., 900 MHz, 2.4 GHz, and 5.6 GHz communication systems), or other relatively localized wireless communication protocol. Use of localized wireless communication may provide a localized region 102 (shown by a dashed-line bubble) where wireless communication among devices (e.g., computer 110 and device 120) located within that region is possible. Devices located with localized region 102 may wirelessly communicate over a local wireless communication path such as paths 140, 141, and 142. As defined herein, a local wireless communication path enables wireless communication using a short-range communications protocol. When a device is not within region 102, that device may be out of range and not able to wirelessly communicate with a device located within region 102. Wireless communication may also be performed with relatively long-range wireless communication protocols such as those used by wireless and cellular phones and personal email devices (e.g., Blackberry (registered trademark)).

While the differences between long-range and short-range wireless communications may at times become blurred (e.g., it may be difficult to differentiate the communication range of long and short-range protocols), one differentiating factor may be the bandwidth or data transfer rate of the wireless communication protocol. Certain short-range protocols may transfer data at a higher rate than long-range protocols. For example, a short-range wireless protocol such as 802.11 may transfer data at 54 Mb/s. Another differentiating factor may be power consumption. Certain short-range protocols may require more power to operate than their long-range counterparts. For example, a Wi-Fi communications protocol may consume more power than a wireless phone broadband communication protocol. Other short-range protocols such as Bluetooth may consume less power than a long-range protocol with a tradeoff that it may not transmit data at a rate higher than the long-range counterpart. Thus, a tradeoff may exist between long and short-range wireless communication protocols, each protocol providing its own advantages.

System 100 may include computers 110 and 115. Computer 110 may include short-range wireless communication circuitry 112 which may be operative to enable computer 110 to wirelessly communicate according to one or more short-range communication protocols. For example, computer 110 may "directly" communicate to personal media device 120 over local wireless path 140. In another example, computer 110 may "indirectly" communicate to device 120 via a communications link including local wireless path 141, wireless router 130, and local wireless path 142. Use of wireless router 130 may expand the range of localized region 102, thereby providing greater mobility for media device 120. If desired, repeater stations (not shown) may be used to further expand the range of localized region 102. A repeater station may be operative to receive a source wireless signal (e.g., signal on local wireless path 142) and transmit that wireless signal with increased strength, effectively boosting an existing wireless network.

Computer 115 may not be equipped with short-range wireless communication circuitry and may use wireless router 130 to wirelessly communicate with personal media device 120. That is, a communications links between computer 115 and media device may include path 160, wireless router 130, and local wireless path 142. Path 160 may be any communications link for transmitting signals, including for example, a wired communications link (e.g., cable) or a wireless link.

Computers 110 and 115 may be, for example, a personal computer, a desktop computer, a laptop computer, or a server. Computers 110 and 115 may include storage devices such as hard-drives and memory, user-interface tools (e.g., keyboard and mouse), and a display device (e.g., an LCD or CRT).

Wireless router 130 and Computers 110 and 115 may be connected to network 150 via path 160. Network 150 may be a public network such as the Internet, a local area network, a wide area network, a private network, telephone network, cable network, broadband network, Ethernet network, digital subscriber line (DSL) network, or any other network that enables computers 110 and 115 and/or media device 120 to access data available stored remote to computers 110 and 115 and media device 120. Network may be connected to a content source 170. Only one content source is shown to avoid overcrowding the figure, however, it is understood that network 150 may access more than one content source.

Content source 170 may provide a wide variety of content and perform numerous desired processes. For example, a content source may store and distribute media (e.g., music, audio books, podcasts, other audio content, television programs, movies, and other video content, weather information, news, stocks, ticketing information, schedule information, or any other desired information) that may be received, for example, by and optionally stored on computers 110 and 115 and/or media device 120. Content provided by content source 170 may be provided, for example, to media device 120 over a path including network 150, wireless router 130, and local wireless path 142, bypassing computers 110 and 115. In other approaches, content from content source 170 may be provided to computers 110 or 115 first, then transmitted to media device 120. Content source 170 may include transaction equipment (not shown) for processing purchase orders for content from the source. In addition, content source may include one or more databases for keeping track of which content has been purchased and for storing a particular user's personal preferences, subscription information, digital signatures, payment authorization information, and other suitable information.

Content source 170 may be application specific and include equipment and processing software required to execute the application. For example, content source 170 may be a server. A digital assets store may be a content source.

System 100 includes a personal media device 120. Personal media device 120 may be an electronic device capable of wirelessly communicating with another device (e.g., computer 110, router 130, another personal media device) using a short-range communication protocol. Personal media device 120 may be constructed to include wireless transmission/reception circuitry 122 operative to communicate according to one or more short-range protocols. In some embodiments, circuitry 122 may be integrated within the packaging of device 120 (as shown in FIG. 1), or in other embodiments, device 120 may be docked or connected to a wireless enabling accessory system (e.g., a wi-fi docking system) that provides device 120 with short-range communicating functionality. Examples of device 120 may include, for example, a media player such as an ipod available by Apple Computer Inc., of Cupertino, Calif., pocket-sized personal computers such as an IPAQ Pocket PC available by Hewlett Packard Inc., of Palo Alto, Calif., personal digital assistants (PDAs), and any other device capable of communicating wirelessly (with or without the aid of a wireless enabling accessory system). Note that personal media device 120 may, in addition to having short-range wireless communication, be capable of long-range wireless communication. An example of such a device includes a wireless phone.

An advantage realized with system 100 is that personal media player 120 may wirelessly synchronize with, for example, computers 110 and 115 to receive media (using one of the communications paths discussed above). Personal media device 120 may also wirelessly sync to content source 170 (by communicating with wireless router 130, which is connected to network 150, which is connected to content source 170. Wireless syncing enables media device 120 to transmit and receive media and data without requiring a wired connection.

During synchronization, a host system may provide media to a client system. In some embodiments, the host system may be computer 110, computer 115, or content source 170 and the client system may be personal media device 120. In these embodiments, media and/or data is "downloaded" to media device 120. For example, media stored on computer 110 (which media may have been obtained from a content source or obtained by a digital medium such as a CD) may be transferred from computer 110 to media device 120 over path 140 or the combination of paths 141 and 142. If content source 170 is the host system, then it may transfer media over path 142 to media device. In other embodiments, the host system may be personal media device 120 and the client system may be computer 110, computer 115, or content source 170. In these embodiments, media may be "uploaded" from media device to the client system. For example, a media device may receive a music file "directly" from content source 170, resulting in a situation where the music file may not be stored on computer 110, but stored on device 120. Device 120 may "upload" that music file to sync the music file library of computer 110 with that of media device 120.

The foregoing discussion of wireless transmission and reception and wireless synchronization is not meant to be an exhaustive discussion. For a more detailed explanation of wireless transmission of media, please see U.S. patent application Ser. No. 10/987,649, filed Nov. 12, 2004, entitled "Wireless Synchronization between Media Player and Host Device," U.S. patent application Ser. No. 11/485,142, filed Jul. 11, 2006, entitled, "Wireless Communication System," U.S. patent application Ser. No. 11/514,806, filed Sep. 1, 2006, entitled "Media Data Transfer," U.S. patent application Ser. No. 11/515,270, filed Sep. 1, 2006, entitled, "Media Data Exchange, Transfer or Delivery for Portable Electronic Devices," each of which are incorporated by reference herein in their entireties.

Figure 2:
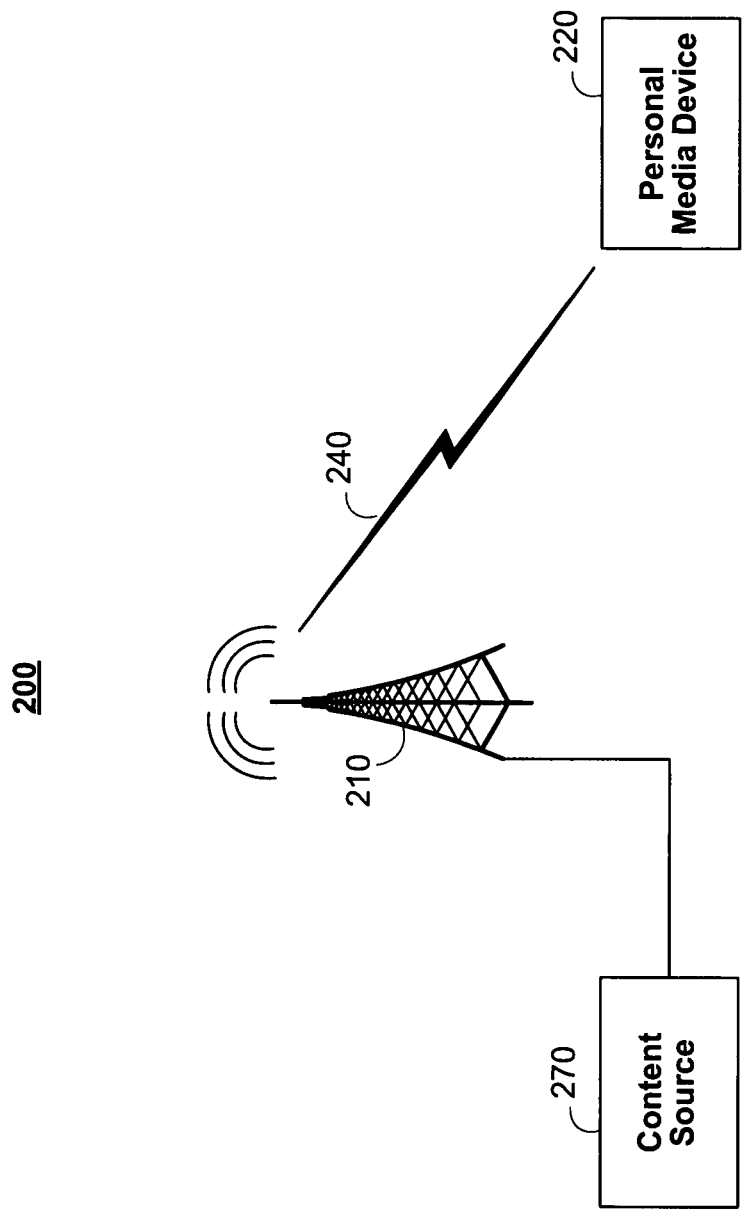
FIG. 2 shows a block diagram of relatively long-range wireless communication system 200 in accordance with the principles of the present invention.

FIG. 2 shows a block diagram of relatively long-range wireless communication system 200 in accordance with the principles of the present invention. System 200 may include a long-range communications transmitter/receiver 210, a personal media device 220, and content source 270. Transmitter/receiver 210 may communicate with media device 220 using a long-range communications protocol over long-range path 240. Content source 270 may be connected to transmitter/receiver 210 so that content stored at content source 270 can be transmitted to media device 220 over path 240.

Figure 3:
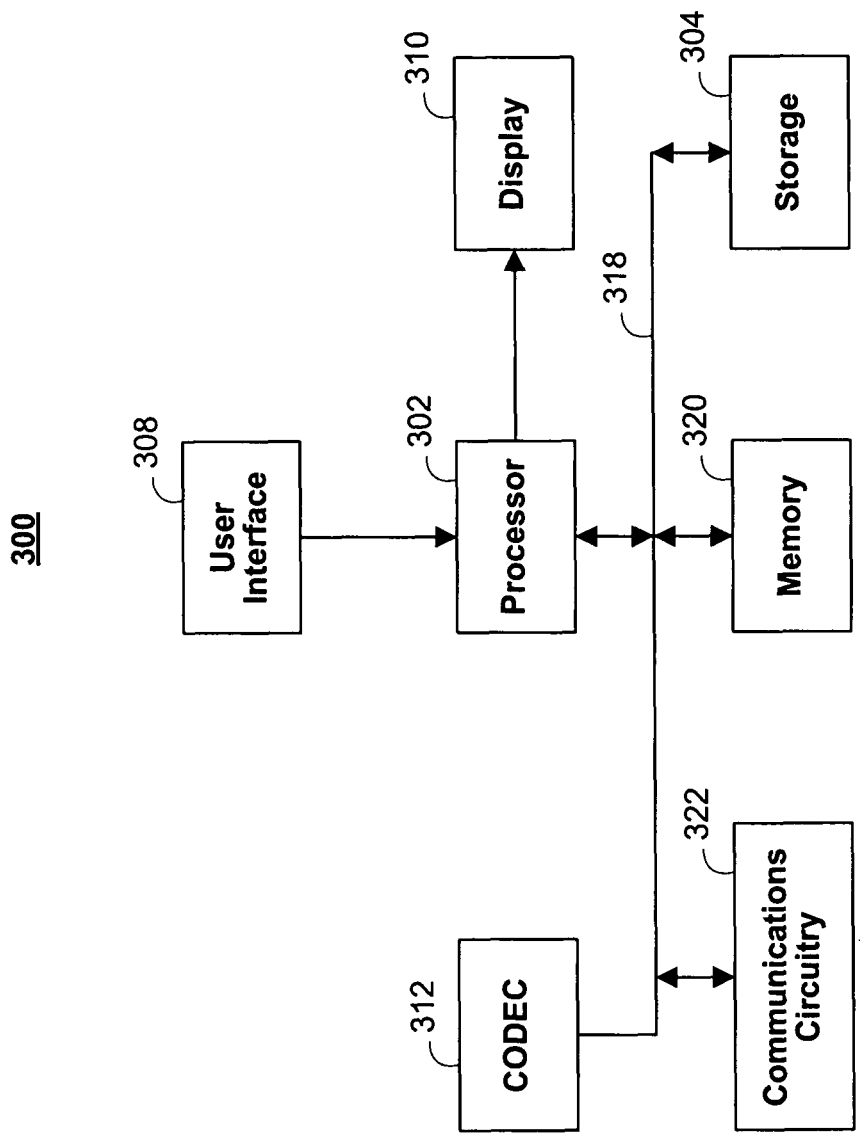
FIG. 3 shows a simplified block diagram of portable media player in accordance with the principles of the present invention.

FIG. 3 shows a simplified block diagram of portable media player 300 in accordance with the principles of the present invention. Media player 300 may include a processor 302, storage device 304, user interface 308, display 310, CODEC 312, bus 318, memory 320, and communications circuitry 322. Processor 302 may control the operation of many functions and other circuitry included in media player 300. Processor 302 may drive display 310 and may receive user inputs from user interface 308.

Storage device 304 may store media (e.g., music and video files), software (e.g., for implanting functions on device 300, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish wireless communication with another device), subscription information (e.g., information that keeps tracks of podcasts or television shows or other media a user subscribes to), and any other suitable data. Storage device 304 may include one more storage mediums, including for example, a hard-drive, permanent memory such as ROM, semi-permanent memory such as RAM, or cache.

Memory 320 may include one or more different types of memory which may be used for performing device functions. For example, memory 320 may include cache, ROM, and/or RAM. Bus 318 may provide a data transfer path for transferring data to, from, or between at least storage device 304, memory 320, and processor 302. Coder/decoder (CODEC) 112 may be included to convert digital audio signals into an analog signal, which may be provided to an output port (not shown).

User interface 308 may allow a user to interact with the media player 300. For example, the user input device 308 can take a variety of forms, such as a button, keypad, dial, a click wheel, or a touch screen. Communications circuitry 322 may include circuitry for wireless communication (e.g., short-range and/or long range communication). For example, the wireless communication circuitry may be wi-fi enabling circuitry that permits wireless communication according to one of the 802.11 standards. Other wireless network protocols standards could also be used, either in alternative to the identified protocols or in addition to the identified protocol. Another network standard may be Bluetooth. Communications circuitry 322 may also include circuitry that enables device 300 to be electrically coupled to another device (e.g., a computer or an accessory device) and communicate with that other device.

In one embodiment, the media player 300 may be a portable computing device dedicated to processing media such as audio and video. For example, media player 300 may be a media player (e.g., MP3 player), a game player, a remote controller, a portable communication device, a remote ordering interface, an audio tour player, or other suitable personal device. Media player 300 may be battery-operated and highly portable so as to allow a user to listen to music, play games or video, record video or take pictures, communicate with others, and/or control other devices. In addition, media player 300 may be sized such that is fits relatively easily into a pocket or hand of the user. By being handheld, the media player 100 is relatively small and easily handled and utilized by its user and thus may be taken practically anywhere the user travels.

Wireless synching of assets may be provided in accordance with the principle of the present invention. Assets, as defined herein, refer to specific name of various types of media content such as, for example, music, movies, podcasts, television shows, and audio broadcast or commentary that may be played by a personal media device (e.g., device 120 of FIG. 1). Assets may be classified into various groups of assets that have a logical classification. For example, a television series (e.g., LOST) may be classified as a series grouping that includes the assets (e.g., the episodes of LOST) of that television series. Another example grouping includes podcast programming (e.g., NPR) where each podcast asset (e.g., a particular airing of an NPR show) may be included that podcast group. Assets in these groupings may first be available as live broadcast (e.g., first showing of a television show on television or first airing of a talk show on the radio) prior to being available for downloading to a personal media player.

A user may subscribe to one or more of such groupings of assets so that new assets are automatically downloaded, for example, to the user's computer (e.g., computer 110 of FIG. 1) or to the user's personal media device. As defined herein, a new asset may be an asset included in a group (e.g., a user subscribed group) that is made available for downloading and has not been downloaded by the user. When a user subscribes to receive a group of assets, a personal media device may be operative to wirelessly download new assets as they become available. For example, when the personal media device is within range of a host system (e.g., computer 110 which may retrieve assets from content source 170), the media device may determine whether a new asset is available, and if so, may wirelessly download that asset.

Figure 4A:
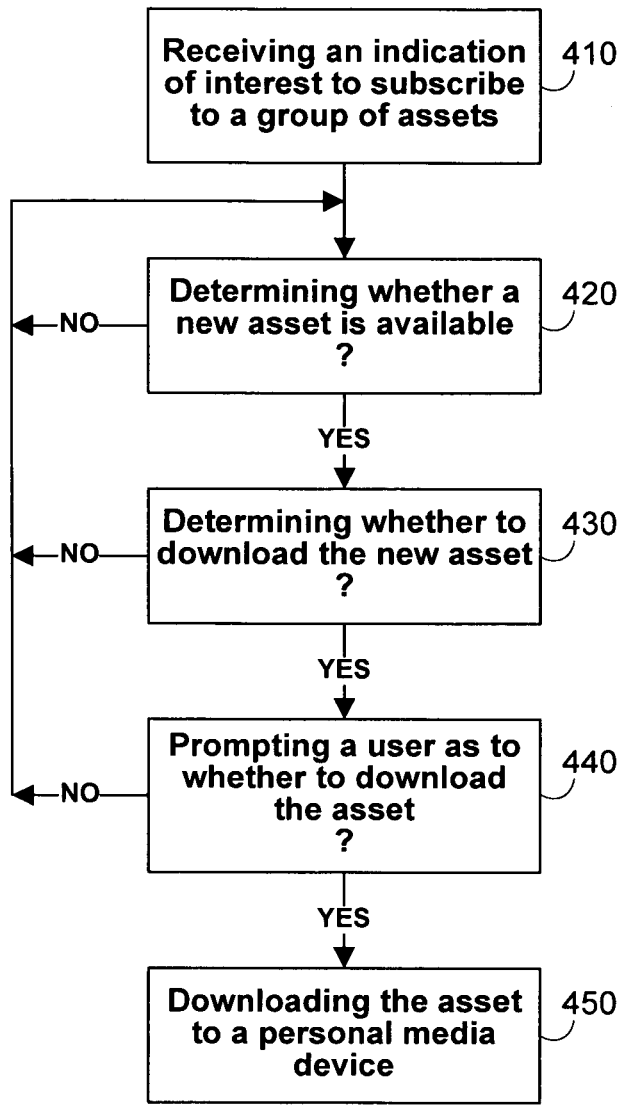
FIGS. 4A and 4B are flowcharts showing steps that may be taken to wirelessly download assets of a subscribed group of assets in accordance with the principles of the present invention.

FIG. 4A is a flowchart showing steps that may be taken to wirelessly download assets of a subscribed group of assets in accordance with the principles of the present invention. At step 410, an indication of interest to subscribe to a group of assets (e.g., television show or podcasts) may be received. A user may specify an indication of interest by configuring a computer or personal media device to download new group assets as they become available. A user may purchase a subscription to a group of assets which purchase may include an entire season or a portion thereof. A user may purchase group pass which entitle the user to download a predetermined number of assets.

At step 420, a determination is made as to whether a new asset is available. If not, the process may loop back to step

420. If yes, the process proceeds to step 430. Determining step 420 may be executed by performing the steps shown in FIG. 4B, which is a flowchart showing steps that may be taken determine if an asset is available for wireless downloading. At step 422, a wireless link may be established with a content source that provides the assets. For example, a media player may establish a wireless link by wirelessly interfacing with a wireless router (e.g., wireless router 130) which may be connected to the content source, for example, by way of a network (e.g., network 150). Alternatively, at step 423, the media player may establish a wireless link with a host device which may have access to the content source providing the assets. For example, a wireless link may be occur when the media player is moved within a predetermined distance of a wireless router (e.g., wireless router 130) electrically coupled to a computer (e.g., computers 110 and 115) or directly to a computer having wireless communication capability (e.g., computer 110). At step 424, the content source is accessed. The content source may be accessed by the media device or a computer (or server) in wireless communication with the media device. At step 426, the content source is checked to determine whether a new asset is available. If an asset is available, then the process proceeds to step 420. If no new asset is available, then the process may loop back to step 420.

At step 430, a determination is made whether to download the new assets. This determination may be made in one several different ways. One may the determination may be made by cross-checking against a database as whether that asset has already been downloaded or the user has indicated a preference not to download the asset (e.g., because the user has already saw or listened to the asset). The database may maintain a record of which assets are downloaded by the user. It does not matter how the assets are downloaded, whether to a personal media device (PMD) or a host device (e.g., computer). This database may reside within the personal media device, a content source providing the assets, a computer, or any combination thereof. The database may also store user decisions denying to download a new asset (e.g., because the user viewed it on the asset as part of it real-time broadcast). If, at step 430, it is determined that the new asset has already been downloaded or previously seen or listened to, the process may loop back to step 420. If not then, the process may proceed to step 440.

At step 440, the user may be prompted whether or not to download the asset. The prompting may take place on the personal media player. If yes, then the system may proceed to step 450, which wirelessly downloads the asset to the personal media device. If no, the process may loop back to step 420. In some embodiments, user selection in response to the prompt may be stored at the content source. For example, a decision to download or not to download may be stored at the content source so that upon subsequent content source access, the content source may know that the user does not want this asset downloaded. It is understood that the user may be provided with other options when prompted whether to download the asset. For example, a user may elect to download the asset at another time and may setup a reminder to have that downloaded later.

Figure 4B:
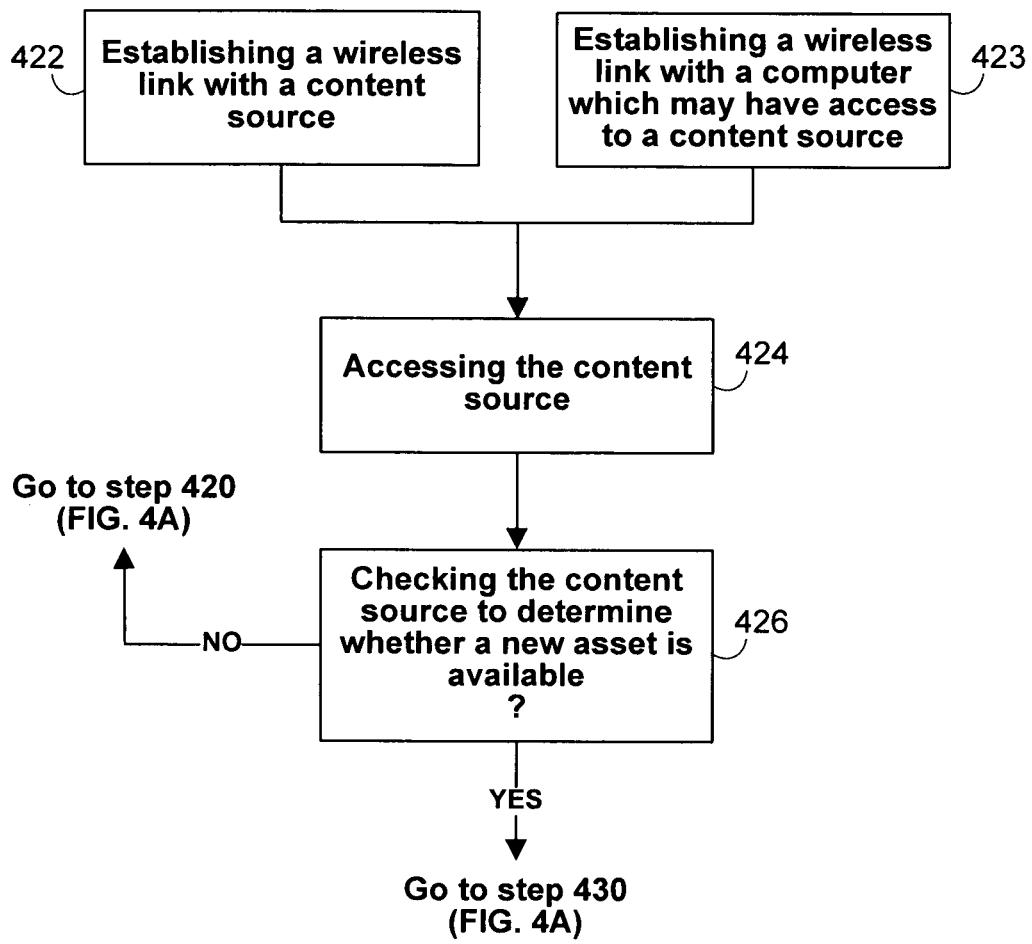

It is understood the steps shown in FIGS. 4A and 4B are merely illustrative and that additional steps may be added and that existing steps may be altered or omitted. For example, prompting step 440 may be omitted if new assets are automatically wirelessly downloaded as they become available. Automatic downloading may be configured as a user preference.

Figure 5:
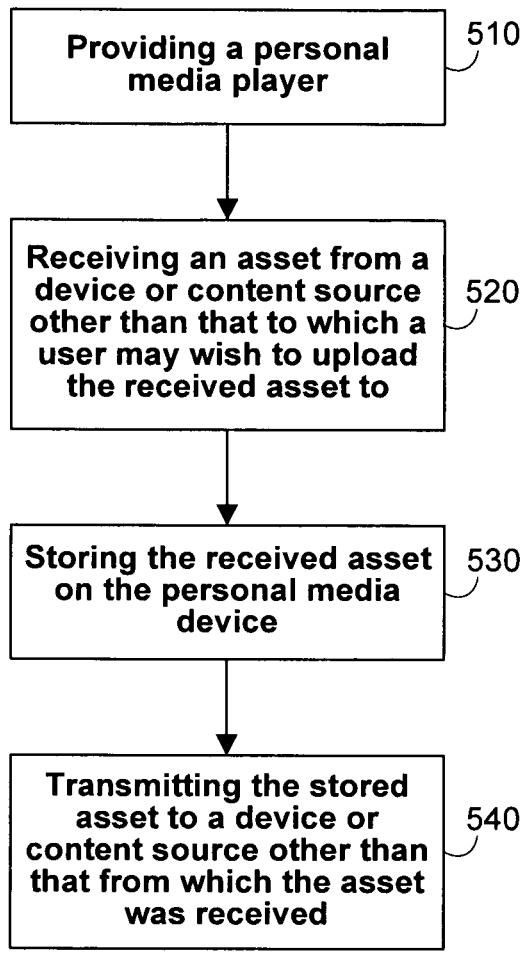
FIG. 5 is a flowchart showing steps that may be taking to upload an asset from a personal media device to another device in accordance with the principles of the present invention.

FIG. 5 is a flowchart showing steps that may be taking to upload an asset from a personal media device to another device in accordance with the principles of the present invention. This flowchart accounts for a situation when a media device has acquired an asset (e.g., from a wireless hub not connected to the user's host computer) and the user desires to sync the contents of the media device with another device (e.g., computer 110) wirelessly. At step 510, a personal media player is provided. At step 520, the personal media player may receive an asset from a source or device other than that to which the user may wish to upload the received asset to. The personal media player may receive the asset using a wireless communication path. At step 530, the received asset may be stored on the personal media device.

At step 540, the stored asset may be transmitted (or uploaded) to a device or source other than that from which the asset was received. The transmission may occur over a wired or wireless communications path. In addition, the transmission may occur automatically based, for example, on user preferences.

It is understood the steps shown in FIG. 5 is merely illustrative and that additional steps may be added and that existing steps may be altered or omitted.

Figure 6:
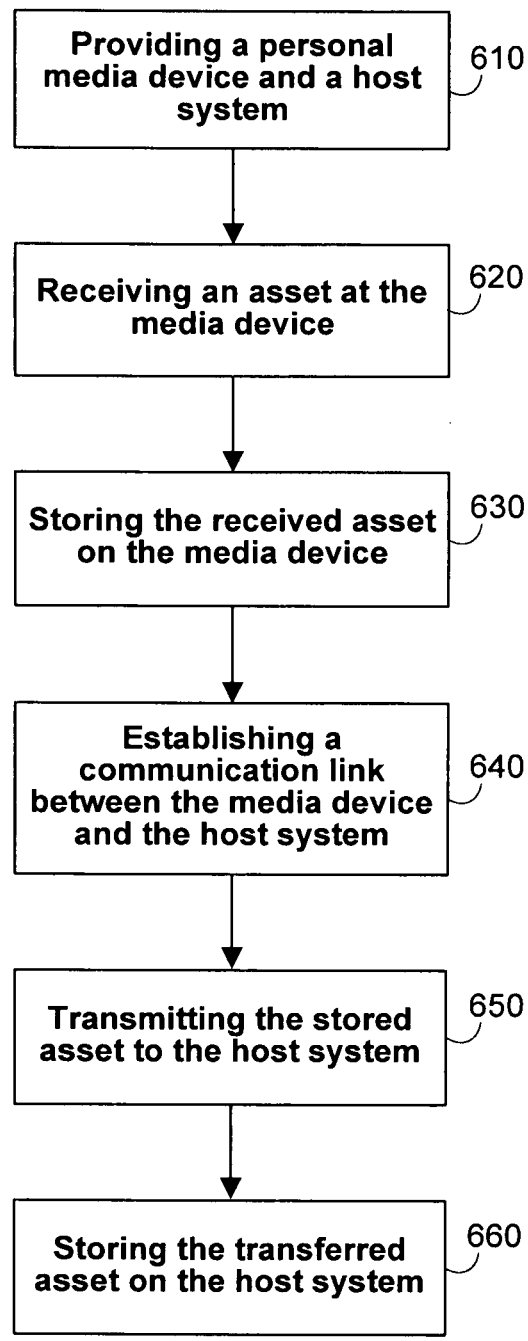
FIG. 6 is a flowchart showing steps that may be taken for syncing assets stored on a personal media device with a host system in accordance with the principles of the present invention.

FIG. 6 is a flowchart showing steps that may be taken for syncing assets stored on a personal media device with a host system in accordance with the principles of the present invention. FIG. 6 may be similar to the flowchart of FIG. 5, but slightly more detailed. At step 610, a personal media player and a host system (e.g., computer 115) are provided. At step 620, an asset is received by the personal media player. The asset may be received over a wired or wireless path. At step 630, the received asset may be stored on the personal media player.

At step 640, a communications link may be established between the personal media device and the host system. The communications link may be established over a wired or wireless path. At step 650, the stored asset may be transmitted from the media device to the host system. The host system may provide an instruction to the media player, instructing the media player to transmit the stored asset. At step 660, the asset may be stored on the host system.

It is understood the steps shown in FIG. 6 is merely illustrative and that additional steps may be added and that existing steps may be altered or omitted.

The personal media device may run software installed on the device. Software such as games, application tools (e.g., calendar program), and other desirable programs may be installed on a personal media device. The software may be transferred to the media device over a wired or wireless path. Some of these software programs may require a wireless path (e.g., a short-range wireless path) to perform properly. For example, a game may require access to the Internet so the user can play against other players. As such, a wireless path connection may be needed to connect to the Internet. As another example, the game may involve a treasure hunt where the user may be required to go to different locations in order to wirelessly receive additional clues to continue the hunt. (A discussion of location-based content is discussed in more detail below.) Yet another example, some games may require wireless connection of two or more media devices. Other software such as application software (e.g., word processor, media managers, etc.) may require updates (e.g., new program versions or add-on programs) that may be downloaded wirelessly. If desired, such updates may be downloaded automatically to a media device wirelessly when a user enters into the range of a short-range wireless communication network. In other approaches, a user may browse through a listing of available "widget" programs available on the short-range wireless communication network that may be added to a program running on the media device.

Figure 7:
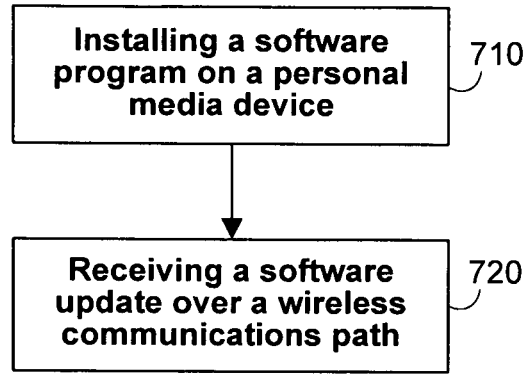
FIG. 7 is a flowchart showing steps that may be taken to wirelessly download update information required of a software program installed on a personal media device in accordance with the principles of the present invention.

FIG. 7 is a flowchart showing steps that may be taken to wirelessly download update information (e.g., data or software updates) required of a software program installed on a personal media device in accordance with the principles of the present invention. At step 710, a software program may be installed on a personal media device. The software program may be provided by a host system over a wired or wireless communications path. The software program may allow for user selectable upgrades or system selected upgrades. At step 720, a software upgrade package may be received over a wireless communications path and installed on the personal media device. The software upgrade may be integrated into the software program installed on the media device. If desired, the media device may ask the user's permission before installing the software upgrade, for example, to satisfy a license agreement.

Figure 8:
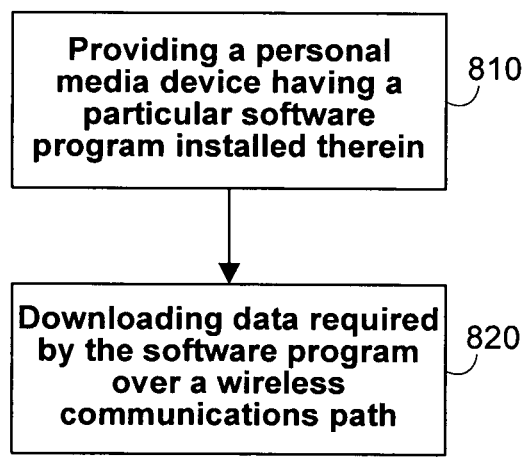
FIG. 8 is a flowchart showing steps that may be taken to wirelessly download data required of a software program installed on a personal media device in accordance with the principles of the present invention.

FIG. 8 is a flowchart showing steps that may be taken to wirelessly download data required of a software program installed on a personal media device in accordance with the principles of the present invention. At step 810, a personal wireless device may be provided that has a particular installed software application. The software application may require data to be received in order to provide the user with the information or functionality required of the application. For example, if the installed program is a stock ticker program, real-time or delayed-time stock quotes may be received over a wireless communications path. For programs requiring "substantial" quantity of data, a wi-fi network connection may be utilized by the media device to receive the data expeditiously, at least compared to the speed at which the same quantity of data may be received using a long-range communications network. At step 820, the data required of the software program may be downloaded over a wireless communications path.

It is understood the steps shown in FIGS. 7 and 8 are merely illustrative and that additional steps may be added and that existing steps may be altered or omitted. For example, the software update and/or data may be downloaded to the media player over wired communications link.

Figure 9A:
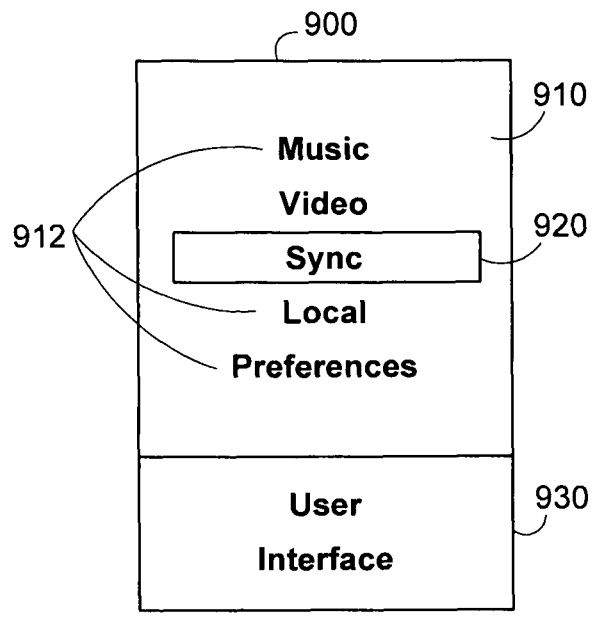
FIGS. 9A-C show illustrative display screens of a personal media device in accordance with the principles of the present invention.

FIG. 9A shows an illustrative display screen 910 of a personal media device 900 in accordance with the principles of the present invention. As shown, a highlight region 920 is shown highlighting one of several selectable items 912. A user may navigate the highlight region using user interface 930. The selectable items 912 may include music, videos, sync, local, and preferences. When a user selects one of items 912, a new screen may be provided with additional information of listings of new selectable items relating to the selected item.

Figure 9B:
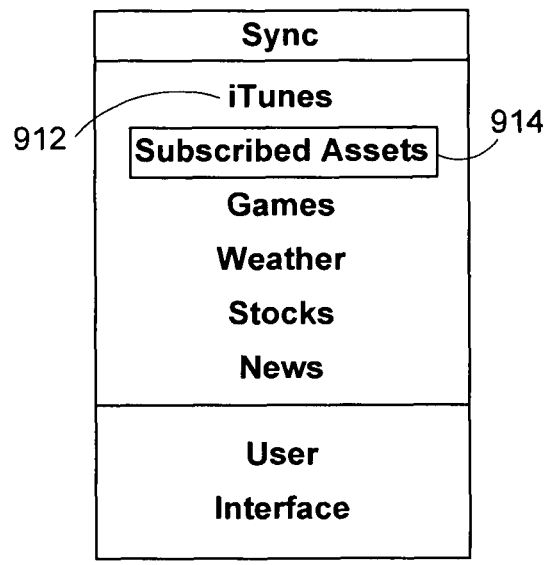
Figure 9C:
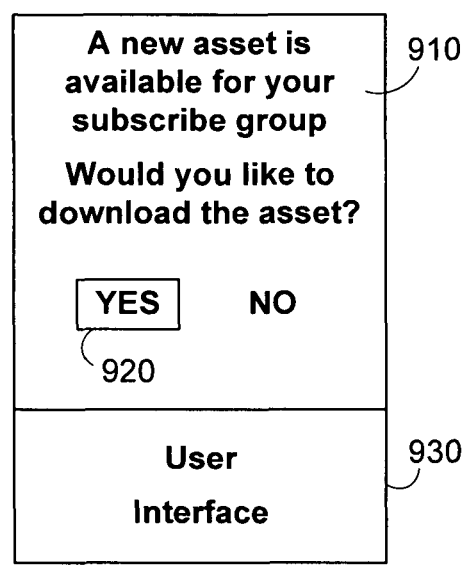

FIG. 9B shows an illustrative display screen 910 that may be displayed in response to selection of the sync item in screen 910 of FIG. 9A. The sync item may enable a user to execute features on media device 900 that may require a wireless communications path. For example, a user may choose to access a content source (to obtain desired assets) by choosing iTunes item 912. In another example, a user may select subscribe assets item 914 to determine whether any new assets are available. Assuming, for example, that item 914 is selected and a new asset is provided, the user may be provided with prompt screen 910 as shown in FIG. 9C. The user may navigate a highlight region 920 to either YES or NO to answer the prompt.

Figure 10:
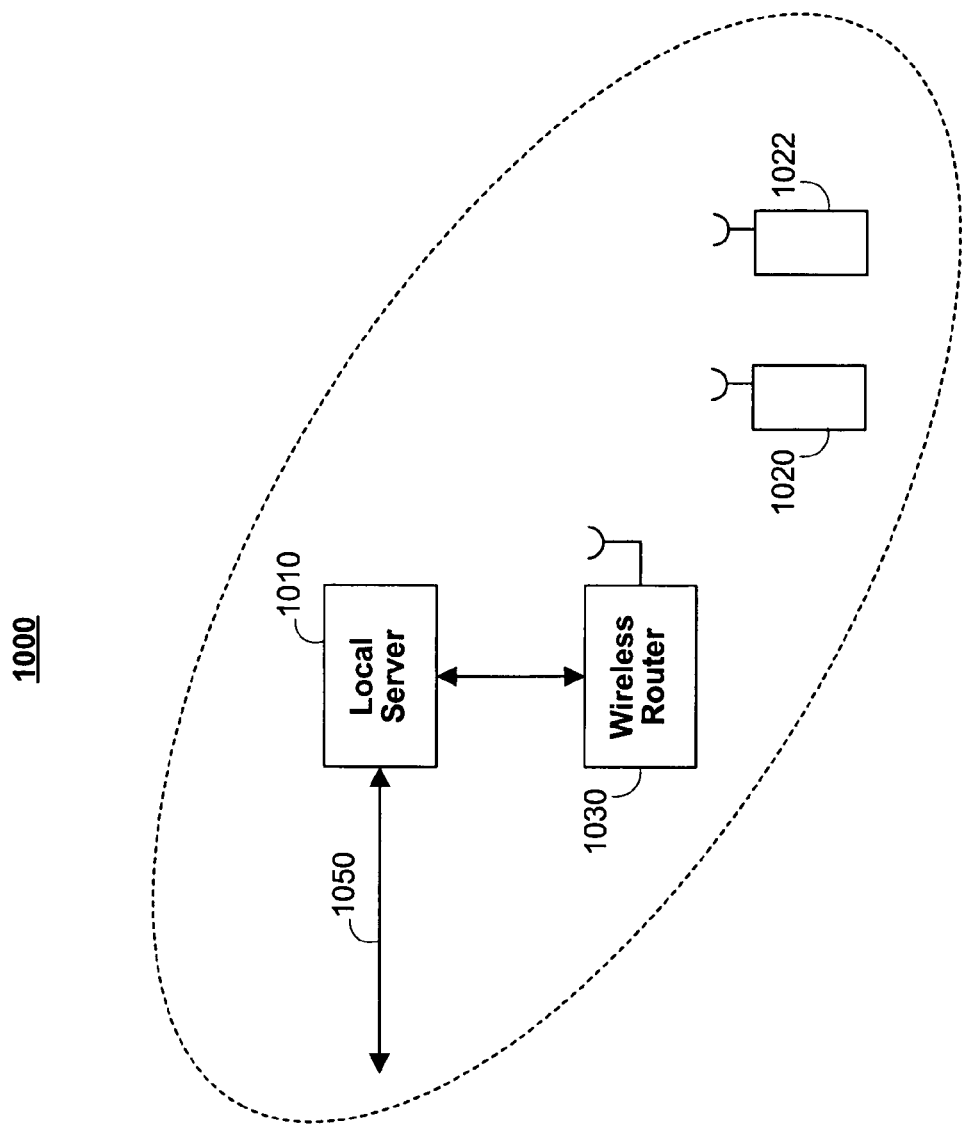
FIG. 10 shows a simplified block diagram of a system that provides location-based content over a wireless communications path to one or more media devices in accordance with the principles of the present invention.

Personal media devices may be operative to receive location-based content in accordance with the principles of the present invention. Location-based content, as defined herein, refers to any content that logically relates to a particular location and that may be received by a personal media device. In some embodiments, the location-based content may be received over a wireless communications path (e.g., over a relative short-range communications protocol), and in other embodiments, may be received over wired communications path. FIG. 10 shows a simplified block diagram of a system 1000 that provides location-based content over a wireless communications path to one or more media devices in accordance with the principles of the present invention. FIG. 10 may be a specific implementation of the system 100 discussed above in connection with FIG. 1, therefore a detailed discussion of each component and communications protocols need not be repeated.

Figure 12:
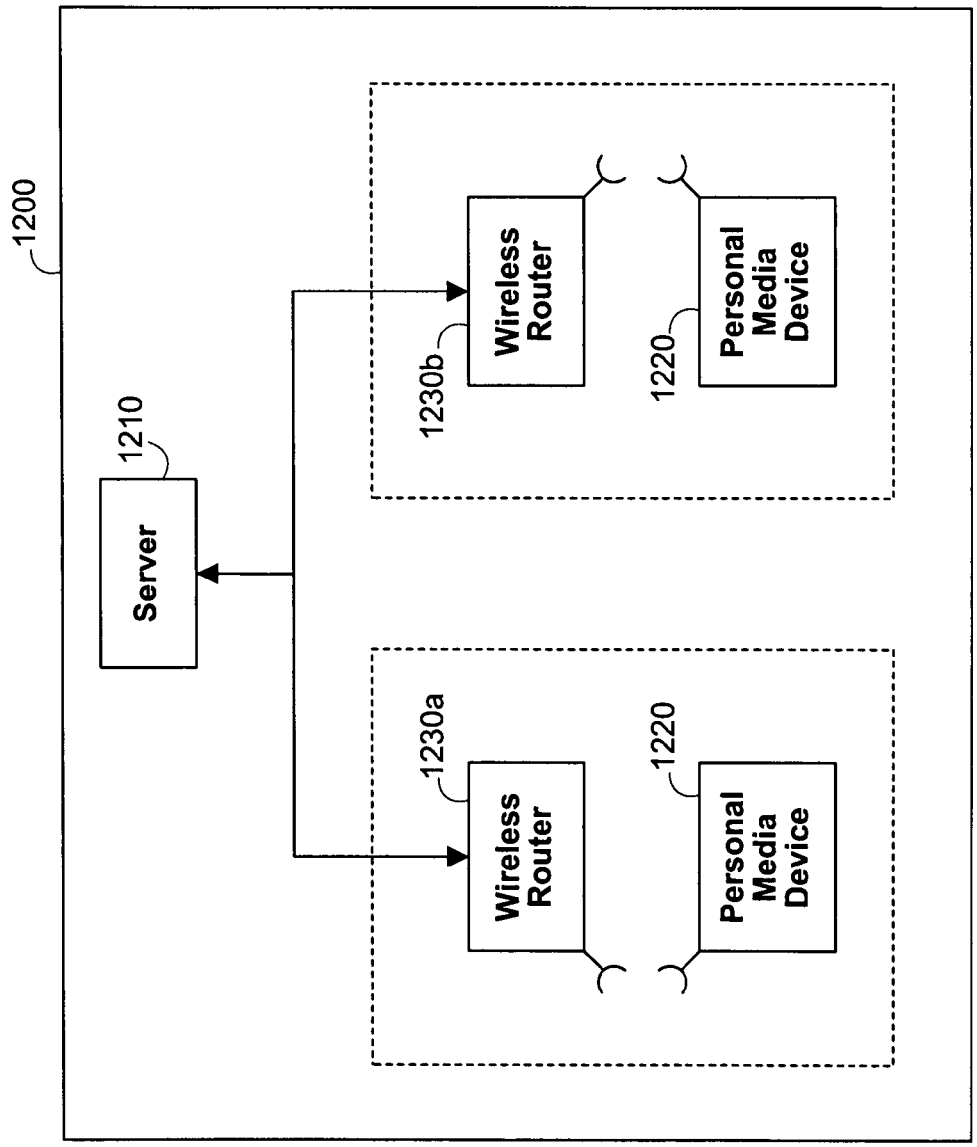
FIG. 12 is another block diagram of a system 1200 that provides location-based content over a wireless communications path to one or more media devices in accordance with the principles of the present invention.

As shown, a local server 1010 (e.g., a computer) is connected to wireless router 1030. Wireless router may cast a short-range wireless network that is local to a particular location. The particular location may include a merchant, a retail establishment, a restaurant, a theater, a concert, a tourist attraction, a transportation hub (e.g., airport or train station), information kiosks, or any other establishment. The local wireless network is illustratively delimited by a dashed-line circle, which encompasses at least media devices 1020 and 1022 and at least a portion of the establishment in which wireless router resides. In some embodiments, the local wireless network may extend beyond the establishment or may be contained relatively exclusively within the establishment. For large establishments, multiple wireless routers may be used to ensure sufficient local area coverage is provided. FIG. 12 shows an example of an establishment using multiple routers in accordance with the principles of the present invention.

Local server 1010 may provide local content to wireless router 1030 for distribution to media devices 1020 and 1022 and any other media device within the wireless local network. The local content may be loaded onto server 1010 locally, for example, by way of a CD or user programming. Local content may be obtained from a remote server (not shown) by accessing external network 1050. Local server 1010 may include a database for storing various information, including for example, the local content, user preference information, and any other suitable information. If desired, another database may be maintained at a central server located remote to the establishment for storing the various information. Local server 1010 may be connected to transaction and logging equipment (not shown) which may be included with the establishment to process orders (which may be received from media device 1020) and exchange of funds (e.g., a credit or debit transaction).

Local server 1010 may be operative to receive data from media devices 1020 and 1022 and process that data to, for example, fulfill a user request (e.g., desire to access additional information or process a product order or food order). For example, assuming the establishment is a restaurant, local server 1010 may provide a menu to media device 1020. A user may choose contents in the menu for an order by interfacing with device 1020 and submit the order to local server 1010 when complete. Local server 1010 may then process that order upon receipt.

Figure 11:
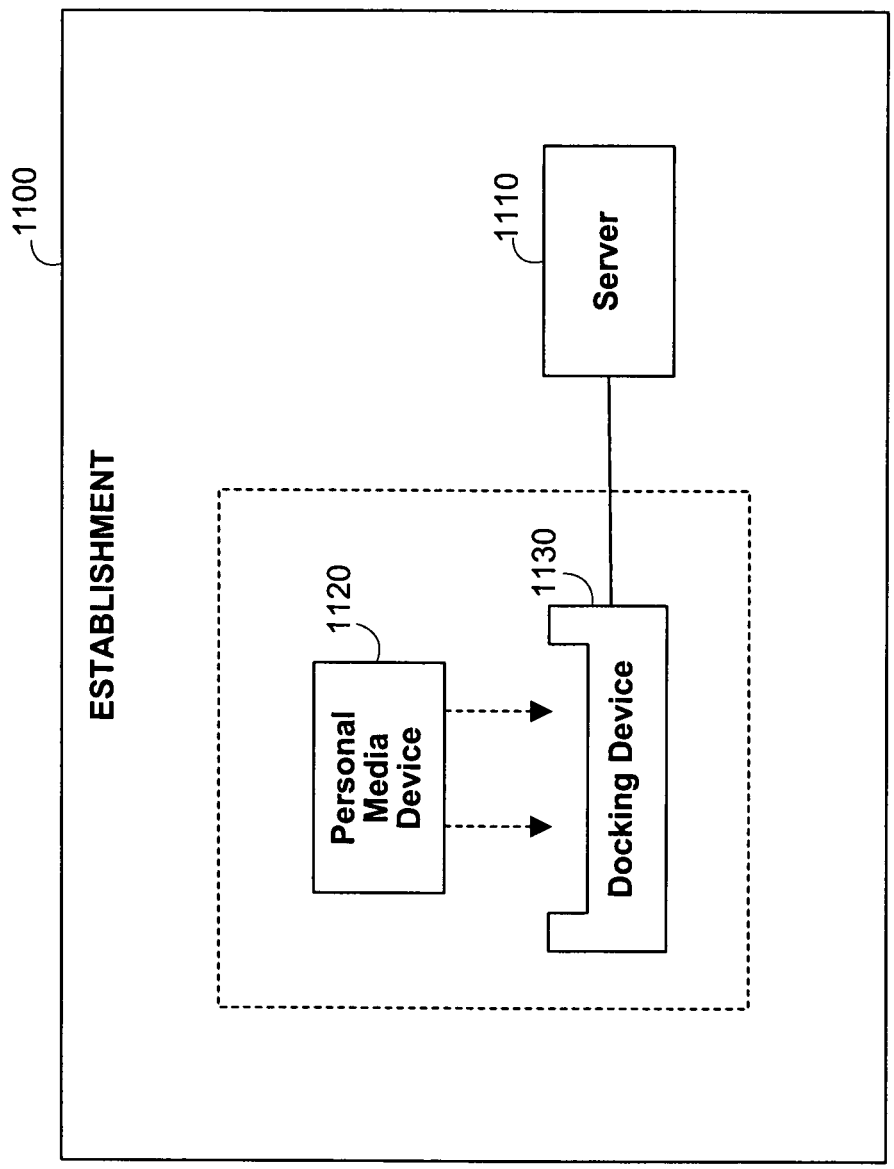
FIG. 11 is a simplified block diagram of a system 1100 that provides location-based content over a wired communications path to one or more media devices in accordance with the principles of the present invention.

FIG. 11 is a simplified block diagram of a system 1100 that provides location-based content over a wired communications path to one or more media devices in accordance with the principles of the present invention. As shown, a docking station 1130 may be electrically coupled to a server 1110. Server 1110 may be similar to server 1010 of FIG. 10 in that it may provide location-specific content and process requests, with a difference that communication is conducted over a wired communications path.

Docking station 1130 may be constructed to connect to personal media device 1120. For example, docking station 1130 may be a cradle that receives media device 1120. As another example, docking station 1130 may include a wire connector that interfaces media device 1120 to server 1110. It is understood that more than one docking station 1130 may be provided for a given establishment, however, only one is shown to avoid overcrowding the figure.

In some embodiments, docking station 1130 may be associated with a particular location in an establishment. For example, in a restaurant, each table may include a docking station 1130, and as such the location of that docking station is known. Thus, when a user places an order on a particular docking station with his or her media device 1120, the merchant may know which table placed the order. In other embodiments, depending on the location of a particular docking station 1130, server 1110 may provide different information. For example, if a user is at a tourist attraction such as a zoo, server 1110 may provide primate information to a docking station located in the primate section of the zoo and may provide lizard information to docking station located in the lizard section. In yet another embodiment, a user may connect to docking station 1130 to download all localized-content onto media device 1120, thereby giving a user the option to access the content when desired. For example, a user may download all localized-content for a tourist attraction (e.g., a museum). When the user moves from one area of the tourist attraction to another, the user may select content appropriate for the area her or she is in. For example, if the user is in the impressionist section of the Metropolitan Museum of Art, the user may select an audio file on impressionist art.

FIG. 12 is another block diagram of a system 1200 that provides location-based content over a wireless communications path to one or more media devices in accordance with the principles of the present invention. System 1200 may be referred to as a distributed network such as citywide public network or a merchant-wide network. System 1200 include at two wireless routers 1230 that may be connected to server 1230. Each wireless router may have its own local area network, delimited by the dashed lines. Thus any device 1220 located within a particular wireless router's local network may be able to communicate with server 1210. An advantage of a system 1200 is that the geographic location of each wireless router may be known. Although not shown in FIG. 12, local area networks of two or more routers may overlap. In fact, overlay of local area networks may be advantageous because it may provide more precise detection of a media device's geographic location (e.g., three wireless routers may be used to triangulate the position of a media device in communication with three routers). Such geographic knowledge may be used to execute various embodiments according to the principles of the invention.

For example, in one embodiment, as a media device 1220 moves from one router's local network to another, media device may automatically download content specific to a particular router. For example, if server 1210 detects the geographic location of media device 1220 to be in the geographic region of router 1230*b*, server 1210 may instruct media device 1220 to play content local to router 1230*b*. In another approach, assuming that media device 1220 has already downloaded all or a portion of the content included on server 1210, when media device 1220 establishes communication with router 1230*a* (e.g., by moving into its local area network), server 1210 may issue a command to media device 1220 to play localized content specific to router 1230*a*. Thus, specific content may be played based on a detected geographic location of a media device. That is, even though the aggregate of routers 1230 may form a larger distributed network, specific content may be provided or cause to be played based on a detected geographic location of media device 1220 within that larger distributed network.

In another embodiment, a user may desire to see what is available (e.g., stores, attractions, restaurants, movie house, etc.) near to his or her present location. To obtain such information, the user may interface with media device 1220 and select a "what's local to me" function. Execution of this function may result in media device 1220 establishing communication with one or more routers to ascertain a geographic position. Local information may be retrieved based on the ascertained geographic position.

Figure 13:
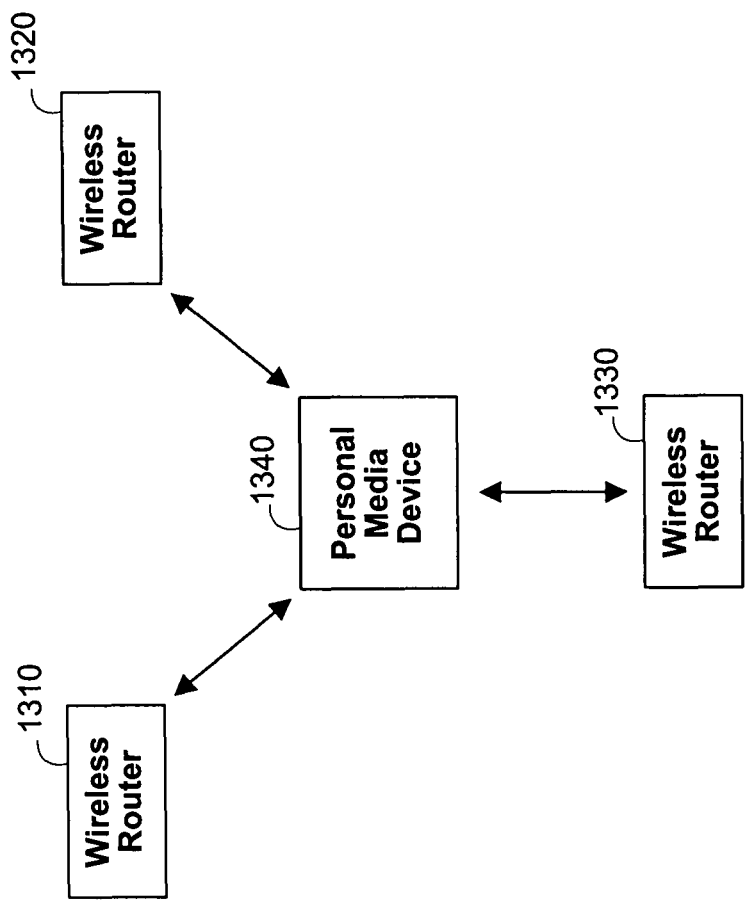
FIG. 13 is a block diagram illustrating how one or more wireless routers may be used to determine a geographic location of a media device in accordance with the principles of the present invention.

FIG. 13 is a block diagram illustrating how one or more wireless routers may be used to determine a geographic location of a media device in accordance with the principles of the present invention. FIG. 13 shows three wireless routers 1310, 1320, and 1330, each of which may or may not be connect to the same server (not shown). Of these, routers 1320 and 1330 are optional. Each router may be associated with a known geographic location. Thus when media device 1340 communicates with any one of routers 1310, 1320, or 1330, the approximate geographic location is known because the range of routers 1310, 1320, and 1330 may be limited to a predetermined distance (e.g., 30-500 feet). With each additional router media device 1340 communications with, the resolution of the geographic location of the media device 1340 may improve.

An electronic ping signal may be used to further narrow down the geographic location of media device 1340. The electronic ping signal may be akin to a sonar signal for determining the distance to an object. The ping signal, like sonar, may be sent from a source (e.g., media device), received by the target (e.g., a wireless router), which sends a return ping signal to the source. The time it takes for the source to receive the return signal may be indicative of the distance from the target. This information may be processed to approximate the geographic location of media device. When ping information is received from two or more wireless routers, that information may be processed to further approximate the geographic location of media device 1340. Geographic location processing may be performed at media device 1340, a server (not shown), or a combination thereof.

Figure 14A:
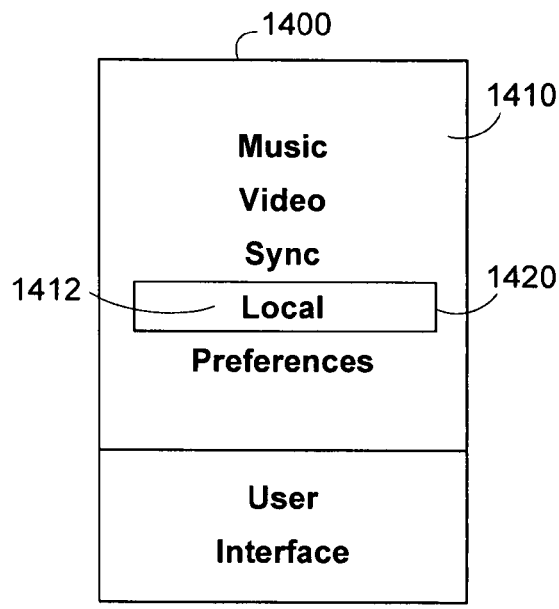
FIG. 14A-B show illustrative display screens of a personal media device in accordance with the principles of the present invention.
Figure 14B:
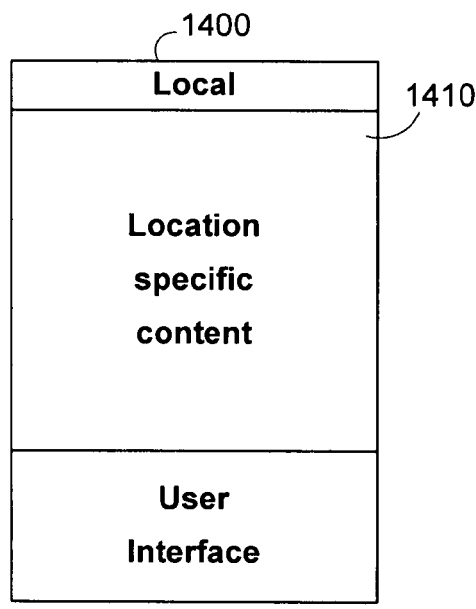

FIG. 14A shows an illustrative display screen 1410 of a personal media device 1400 in accordance with the principles of the present invention. As shown, a highlight region 1420 is shown highlighting local item 1412. Selection of highlight local item 1412 may result in media device 1400 displaying display screen 1410 of FIG. 14B. Display screen 1410 shows location specific content. Such content may be any location-based content that may be displayed in accordance with the principles of the present invention. For example, any one of systems 1000, 1100, and 1200 may be used to provide location-based content media device 1400.

Figure 15B:
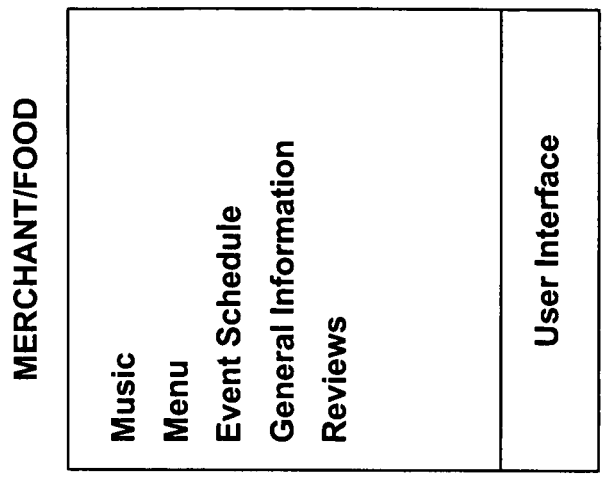
FIGS. 15A-G show embodiments of several different types of location-based content that may be provided to a media device in accordance with the principles of the present invention.
Figure 15A:
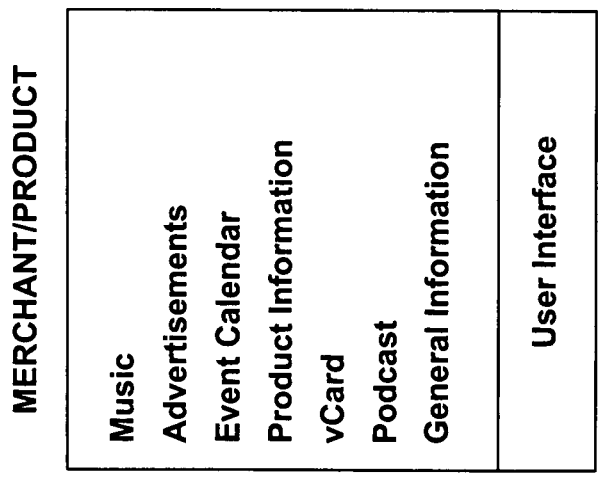

FIGS. 15A-G show embodiments of several different types of location-based content that may be provided to a media device in accordance with the principles of the present invention. FIG. 15A indicates various location-based content that may be provided in connection with a merchant that sells goods and articles of manufacture. For example, a user may access music (e.g., being freely broadcast by the establishment or for sale on content source), advertisements (e.g., coupon specials, video advertisements, and audio advertisements), event calendar (e.g., to learn of exciting new events that may be occurring at the merchant), virtual card information may be exchanged, podcast, general information on merchant (e.g., return policies), product information (e.g., graphics of products, reviews of products, etc.), or any other suitable information pertinent to the merchant.

FIG. 15B indicates various location-based content that may be provided in connection with a merchant that sells food (e.g., a restaurant). For example, such a merchant may provide music (e.g., for purchase or for free listening), a menu (e.g., from which a user may place orders for foodstuffs), event schedule, general information on the merchant, reviews (e.g., Zagat survey), and any other suitable information pertinent to the merchant.

Figures 15C, 15D:
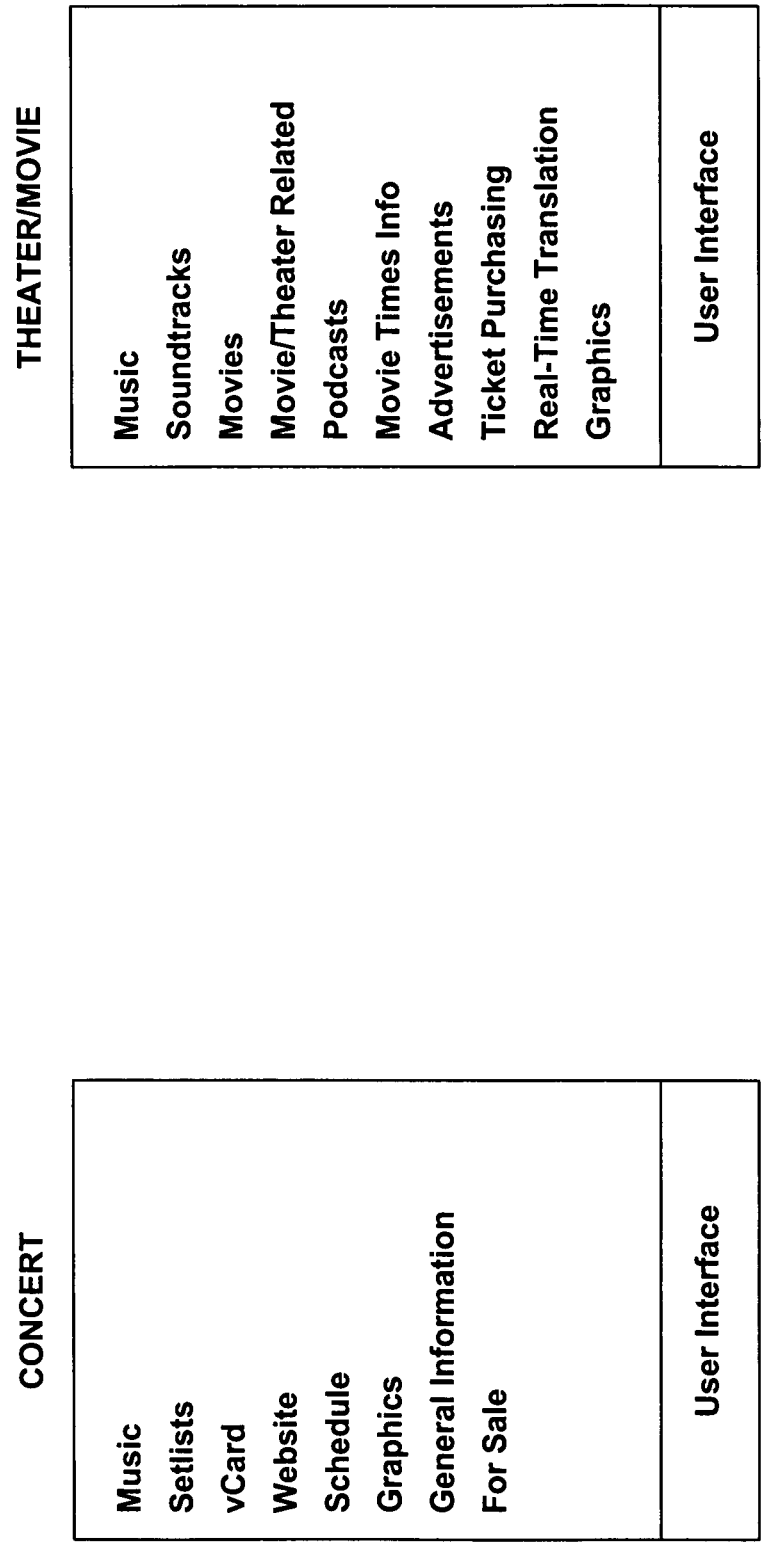

FIG. 15C indicates various location-based content that may be provided in connection with a concert or other music venue. A concert or music venue may provide content including, for example, music, setlists, virtual cards, website information, schedule information (e.g., for upcoming shows at the venue), graphics (e.g., album art, pictures of the band members, etc.), ticket sales (e.g., provide user option to purchase tickets in advance), general information relating to the concert, or any other information.

FIG. 15D indicates various location-based content that may be provided in connection with a theater or movie. For example, local content may include music, soundtracks (e.g., for purchase from a content source), movies (e.g., for purchase from content source), podcast (e.g., audio commentary relating to the movie such as director's commentary), showtime schedule, advertisements, ticket purchasing, real-time translation (e.g., if a foreign file or an opera in a foreign language), graphics, or any other suitable information.

Figure 15F:
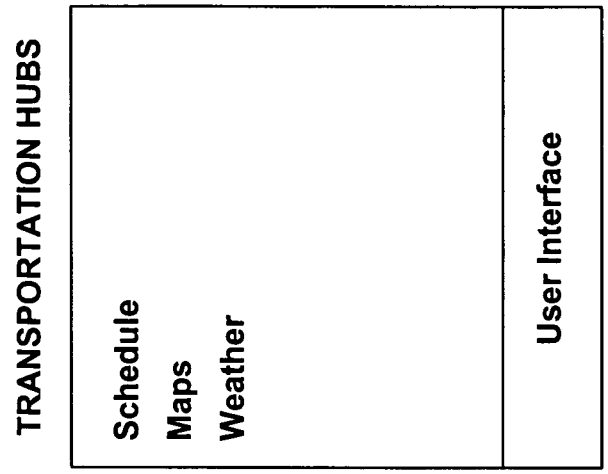
Figure 15E:
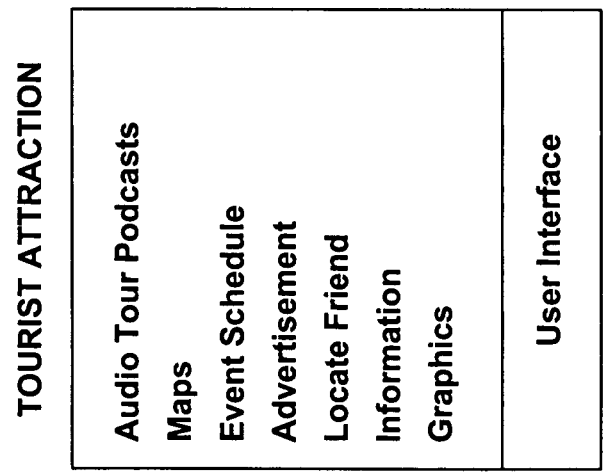

FIG. 15E indicates various location-based content that may be provided in connection with a tourist attraction (e.g., a museum or zoo). Local content may include, for example, audio podcasts, maps, event schedule, advertisements, general information, graphics (e.g., animal pictures), and any other suitable information. Because tourist attractions can be relatively large (e.g., Disney World) and children often frequent such places, parents may be concerned of a child's whereabouts if not directly within their sight. Assuming the parent and child both have a media device, and the tourist attraction or other large area (e.g., city) has a distributed network, a location program may be executed to determine the location of the child's media device.

Figure 15G:

FIG. 15F indicates various location-based content that may be provided in connection with a transportation hub (e.g., an airport, bus station, or train station). Localized content may include, for example, schedules, maps, weather, city information, or any other suitable content. FIG. 15G indicates various location-based content that may be provided in connection with a merchant that sells groceries. Localized content may include, for example, advertisements (e.g., weekly flyer), shopping lists, suggested foods (e.g., to adhere to a preferred eating lifestyle such as vegetarian), recipes, music, and any other suitable content.

It is understood that other localized content not specifically mentioned herein may provided to a personal media device. It is also understood that the specific instances of localized content provided for by particular establishment as discussed above is not meant to be an indication of the only content that may be provided by that particular establishment.

Figure 16:
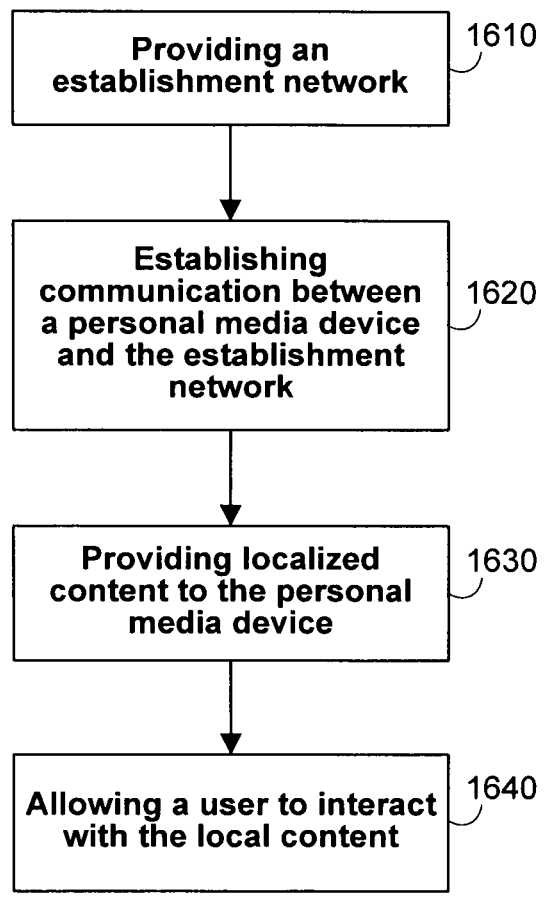
FIG. 16 is a flowchart showing steps that may be taken to provide localized content to a personal media device in accordance with the principles of the present invention.

FIG. 16 is a flowchart showing steps that may be taken to provide localized content to a personal media device in accordance with the principles of the present invention. At step 1610, an establishment network may be provided. An establishment network may be a local wireless network, a local wired network, or a distributed network such as those discussed above in connection with FIGS. 10, 11, and 12, respectively. At step 1620, communication between a personal media device and the establishment network may be established. The established communication may be a wired or a wireless communication path, depending, for example, on the system interfacing with the media device.

At step 1630, localized content may be provided to the personal media device. At step 1640, a user may be allowed to interact with the content. For example, the user may request additional content, place an order for food or drinks, obtain geographic coordinates, playback selected media content, or purchase content (e.g., songs).

Figure 17:
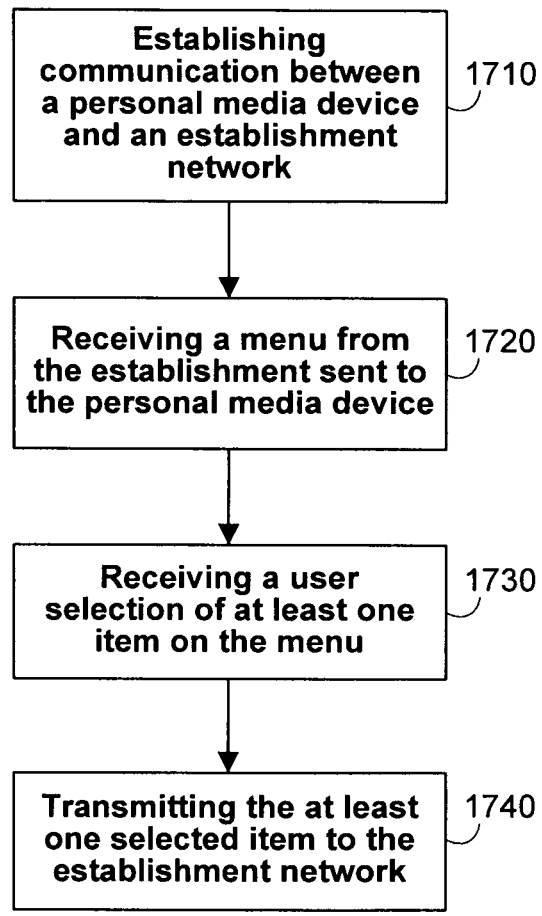
FIG. 17 is a flowchart showing steps that may be taken to provide localized content from a food merchant to a personal media device in accordance with the principles of the present invention.

FIG. 17 is a flowchart showing steps that may be taken to provide localized content from a food merchant to a personal media device in accordance with the principles of the present invention. At step 1710, a personal media device establishes communication with an establishment network (e.g. a restaurant local area network). The establishment network may be a wireless or wired network. If desired, the network may access data on a server remote to the establishment network.

At step 1720, a menu may be received as localized content from the establishment to the personal media device. In some embodiments, the menu may be customized for a the user of the personal media device. For example, the personal media device may have stored thereon, user preference profiles for desired foods. If it is known that user of device has a dietary restriction (e.g., diabetic) or prefers to eat vegan food, the menu may be customized such that only the food the user is permitted to eat or prefers to eat is provided on the menu. The user preference profile may be uploaded to the merchant server, which may generate a custom menu to be provided to the personal media device. In another approach, the entire menu may be provided to the media device, but the media device may filter out content based on the user preference profiles to provide a custom menu.

In another embodiment in furtherance to the customize menu embodiment, a food rewards systems may be implemented to reward a user with the option to eat normally restricted food (e.g., dessert) if it is determined that the user has earned the reward. Personal media devices may be able to monitor a user's health (e.g., by measuring the number of steps a person has taken or by monitoring a person's pulse). This health information may be collected over the course of a day, week, or other predetermined period of time. Depending on the level of physical activity and monitored health, the personal media device may provide the user with a reward. This reward may be "cashed in" when a menu is customized to include food that would not otherwise be included.

At step 1730, user selection of at least one item on the menu may be received. Then, at step 1740, the at least one selected item may be transmitted to the establishment network.

In some embodiments, a user may instruct his or her personal media device to automatically order or select one or more items from a establishment in accordance with the principles of the present invention. Automatic ordering or selection may occur when the user knows in advance what item or items he or she typically orders from a particular establishment. For example, a user may prefer a medium-sized coffee, with one sugar and cream. When the user comes into range of the establishment's network (e.g., a wireless network), the media device may automatically place the order for the coffee. In another approach, the media device may automatically select the items to be order, thereby providing the user with the option to confirm the purchase order. The automatic ordering or selection of the item or items may be based on a user preference profile stored on the media device or on the establishment's database.

Thus it is seen that personal media devices may find use in many wireless and wired applications. Those skilled in the art will appreciate that the invention can be practiced by other than the described embodiments, which are presented for purposes of illustration rather than of limitation, and the invention is limited only by the claims which follow.

What is claimed is:

1. A method for downloading media assets of a subscribed group of media assets, the method comprising:
receiving an indication of interest in a subscription to a group of media assets;
establishing a communication link with a content source;
accessing the content source;
checking the content source to determine whether a media asset is available in the subscription of interest;
determining whether to download the media asset to a personal media device associated with a user based at least partially on whether the media asset has been previously accessed by a different device associated with the user and a user download preference of whether to download media assets that have been previously accessed by the user; and
in response to determining that the media asset is to be downloaded, downloading the media asset to the personal media device.

2. The method of claim 1, wherein establishing the communication link with the content source comprises:
establishing a wireless link with a wireless router having access to a content source.

3. The method of claim 1, wherein the group of media assets comprises at least one of episodes from a television series and programming from a podcast series.

4. The method of claim 1, wherein determining whether to download the media asset to the personal media device comprises:
cross-checking against a database to determine if the media asset has already been downloaded by the different device, wherein the personal media device comprises the database.

5. The method of claim 1, wherein determining whether to download the media asset to the personal media device comprises:
cross-checking against a database to determine whether a user has provided the user download preference, wherein the personal media device comprises the database.

6. The method of claim 1, further comprising:
prompting a user as to whether to download the media asset.

7. The method of claim 1, wherein the downloading comprises:
wirelessly downloading the media asset using a short-range wireless path.

8. A system for wirelessly downloading media assets of a subscribed group of media assets, the system comprising a personal media device associated with a user, the system operative to:
receive an indication of interest in a subscription to a group of media assets, wherein the group of media assets comprises a series grouping;
determine whether a media asset is available in the subscription of interest;
determine whether to download the media asset to the personal media device based at least partially on whether the media asset has been previously accessed by a different device associated with the user and a user download preference of whether to download media assets that have been previously accessed by the user; and
in response to a determination that the media asset is to be downloaded, download the media asset to the personal media device.

9. The system of claim 8, the system operative to:
establish a wireless link between the personal media device and a wireless router having access to a content source;
access the content source; and
check the content source to determine whether the media asset is available.

10. The system of claim 8, the system operative to:
establish a wireless link between the personal media device and a computer that has access to a content source;
access the content source; and
check the content source to determine whether the media asset is available.

11. The system of claim 8, the system operative to:
cross-check against a database to determine if the media asset has already been downloaded by the different device, wherein the personal media device comprises the database.

12. The system of claim 8, the system operative to:
cross-check against a database to determine whether a user has provided the user download preference, wherein the personal media device comprises the database.

13. The system of claim 8, the system operative to:
prompt a user as to whether to download the media asset.

14. The system of claim 8, the system operative to:
wirelessly download the media asset using a short-range wireless path.

15. The system of claim 8, wherein the series grouping comprises episodes of a television series.

16. The system of claim 8, wherein the series grouping comprises podcast assets of a podcast program.

* * * * *